(12) United States Patent
Dearing et al.

(10) Patent No.: US 7,801,925 B2
(45) Date of Patent: Sep. 21, 2010

(54) SYSTEM AND METHOD FOR ELECTRONICALLY PROCESSING ADDRESS INFORMATION

(75) Inventors: Stephen M. Dearing, Cordova, TN (US); David J. Payne, Collierville, TN (US); James D. Wilson, Collierville, TN (US)

(73) Assignee: United States Postal Service, Washington, DC (US)

( * ) Notice: Subject to any disclaimer, the term of this patent is extended or adjusted under 35 U.S.C. 154(b) by 155 days.

(21) Appl. No.: 11/312,390

(22) Filed: Dec. 21, 2005

(65) Prior Publication Data

US 2006/0276916 A1    Dec. 7, 2006

Related U.S. Application Data

(60) Provisional application No. 60/637,738, filed on Dec. 22, 2004.

(51) Int. Cl.
*G06F 7/00* (2006.01)
*G06F 17/30* (2006.01)

(52) U.S. Cl. .................................................. 707/802

(58) Field of Classification Search ............ 707/104.1, 707/802, 803; 209/584, 900
See application file for complete search history.

(56) References Cited

U.S. PATENT DOCUMENTS

| | | | |
|---|---|---|---|
| 5,072,400 A * | 12/1991 | Manduley | 700/226 |
| 5,079,714 A * | 1/1992 | Manduley et al. | 700/219 |
| 5,204,966 A | 4/1993 | Wittenberg et al. | |
| 5,287,271 A | 2/1994 | Rosenbaum | |
| 5,422,821 A * | 6/1995 | Allen et al. | 700/219 |
| 5,452,203 A * | 9/1995 | Moore | 1/1 |
| 5,454,038 A * | 9/1995 | Cordery et al. | 705/60 |
| 5,491,752 A | 2/1996 | Kaufman et al. | |
| 5,703,783 A * | 12/1997 | Allen et al. | 700/213 |
| 5,734,568 A | 3/1998 | Borgendale et al. | |
| 5,742,807 A | 4/1998 | Masinter | |
| 5,754,671 A * | 5/1998 | Higgins et al. | 382/101 |
| 5,903,651 A | 5/1999 | Kocher | |
| 5,925,864 A * | 7/1999 | Sansone et al. | 235/375 |

(Continued)

FOREIGN PATENT DOCUMENTS

WO    WO 2004/023711 A1    3/2004

OTHER PUBLICATIONS

Schäfer, Hartmut, et al., "How Postal Address Readers Are Made Adaptive", Adaptive READ Research Project, LNCS 2956, Springer-Verlag, Berlin, Germany, Apr. 1, 2004, pp. 187-215.*

(Continued)

*Primary Examiner*—Robert Stevens
(74) *Attorney, Agent, or Firm*—Finnegan, Henderson, Farabow, Garrett & Dunner, LLP (57) ABSTRACT

Systems and methods for electronically correcting uncoded addresses include collecting uncoded addresses in an uncoded address database, sorting uncoded addresses by postal code, automatically emailing delivery personnel to notify them they have records to resolve, limiting personnel's access to various postal codes, correcting and/or adjusting the address, determining whether the corrected address delivery point validates, and if no match can be made after correcting and/or adjusting the address, sending the address to a delivery unit with Delivery Force Knowledge™ to correct the address and return the correction for delivery point validation.

27 Claims, 5 Drawing Sheets

U.S. PATENT DOCUMENTS

| | | | |
|---|---|---|---|
| 5,933,604 A | | 8/1999 | Inakoshi |
| 5,953,427 A | * | 9/1999 | Cordery et al. ............... 380/51 |
| 5,966,542 A | | 10/1999 | Tock |
| 6,006,200 A | | 12/1999 | Boies et al. |
| 6,131,101 A | * | 10/2000 | Maitino et al. .............. 707/201 |
| 6,175,827 B1 | * | 1/2001 | Cordery et al. ............. 705/410 |
| 6,269,171 B1 | | 7/2001 | Gozzo et al. |
| 6,289,334 B1 | | 9/2001 | Reiner et al. |
| 6,308,247 B1 | | 10/2001 | Ackerman et al. |
| 6,327,373 B1 | * | 12/2001 | Yura .......................... 382/101 |
| 6,347,376 B1 | | 2/2002 | Attwood et al. |
| 6,457,012 B1 | | 9/2002 | Jatkowski |
| 6,516,320 B1 | | 2/2003 | Odom et al. |
| 6,598,748 B2 | | 7/2003 | Mileaf et al. |
| 6,741,724 B1 | * | 5/2004 | Bruce et al. ................. 382/101 |
| 6,754,785 B2 | | 6/2004 | Chow et al. |
| 6,763,344 B1 | | 7/2004 | Osentoski et al. |
| 6,826,548 B2 | * | 11/2004 | Hungerpiller et al. ....... 705/401 |
| 6,954,729 B2 | * | 10/2005 | Lee et al. ....................... 705/1 |
| 7,080,122 B2 | * | 7/2006 | Bilbrey et al. .............. 709/206 |
| 7,233,929 B1 | * | 6/2007 | Lingle et al. ................ 705/402 |
| 7,305,404 B2 | * | 12/2007 | Owens et al. ............... 707/101 |
| 2001/0044783 A1 | | 11/2001 | Weisberg et al. |
| 2001/0054031 A1 | * | 12/2001 | Lee et al. .................... 705/406 |
| 2002/0029202 A1 | * | 3/2002 | Lopez ........................ 705/406 |
| 2002/0049670 A1 | | 4/2002 | Moritsu et al. |
| 2002/0103932 A1 | * | 8/2002 | Bilbrey et al. .............. 709/245 |
| 2002/0147731 A1 | * | 10/2002 | Seestrom et al. .......... 707/104.1 |
| 2002/0188690 A1 | * | 12/2002 | Lee ............................ 709/206 |
| 2003/0028783 A1 | | 2/2003 | Collins et al. |
| 2003/0109954 A1 | * | 6/2003 | Daniels et al. .............. 700/226 |
| 2003/0114955 A1 | * | 6/2003 | Daniels, Jr. ................. 700/224 |
| 2003/0114956 A1 | * | 6/2003 | Cullen et al. ................ 700/225 |
| 2003/0115060 A1 | * | 6/2003 | Junqua et al. ............... 704/235 |
| 2003/0135567 A1 | * | 7/2003 | Reilly ........................ 709/206 |
| 2003/0177021 A1 | | 9/2003 | Dutta |
| 2003/0182017 A1 | * | 9/2003 | O'Donohue et al. ........ 700/224 |
| 2003/0182018 A1 | * | 9/2003 | Snapp ........................ 700/225 |
| 2003/0182568 A1 | | 9/2003 | Snapp et al. |
| 2003/0191651 A1 | * | 10/2003 | Hungerpiller et al. .......... 705/1 |
| 2004/0005080 A1 | | 1/2004 | Hayduchok |
| 2004/0015453 A1 | * | 1/2004 | Youngblood et al. ........ 705/410 |
| 2004/0065598 A1 | | 4/2004 | Ross et al. |
| 2004/0093222 A1 | * | 5/2004 | Sipe et al. ....................... 705/1 |
| 2004/0111443 A1 | | 6/2004 | Wong et al. |
| 2004/0128274 A1 | | 7/2004 | Snapp et al. |
| 2004/0177305 A1 | * | 9/2004 | Payne et al. ................. 714/746 |
| 2004/0210763 A1 | | 10/2004 | Jonas |
| 2004/0225543 A1 | * | 11/2004 | Kapochunas et al. ........... 705/7 |
| 2005/0060556 A1 | | 3/2005 | Jonas |
| 2005/0066182 A1 | | 3/2005 | Jonas et al. |
| 2005/0075988 A1 | * | 4/2005 | Cordery et al. ............. 705/404 |
| 2005/0086256 A1 | * | 4/2005 | Owens et al. ........... 707/103 R |
| 2005/0137991 A1 | * | 6/2005 | Bruce et al. ................. 705/410 |
| 2005/0171922 A1 | * | 8/2005 | Leary et al. ................. 705/408 |
| 2008/0027980 A1 | * | 1/2008 | Owens et al. ........... 707/103 R |

OTHER PUBLICATIONS

Ruhnke, Megan C., "The Address Listing Operation and Its Impact on the Master Address File", Census 2000 Evaluation F.2, Jan. 30, 2002, 42 pages (cover, spacer, i-vi and 1-34).*

Zhang, Jianting, et al., "A GMI-Based Open Architecture for Building a Geographic Search Engine Over the Internet", WISE 2001, Kyoto, Japan, Dec. 3-6, 2001, pp. 25-32.*

"International Postal Address Components and Templates", UPU Draft S42-4, Feb. 3, 2004, pp. i-vi and 1-158.*

PCT International Search Report and Written Opinion in International Application No. PCT/US05/46558, dated Jan. 25. 2007 (8 pages).

Carter et al., "Exact and Approximate Membership Testers," ACM $10^{th}$ STOC, pp. 59-65, (1978).

Bellare et al.; "Collision-Resistant Hashing: Towards Making UOWHFs Practical"; Proceedings of the Annual Int'l Cryptology Conference (CRYPTO); Berlin, Springer, Germany; Vol. Conf. 17, pp. 470-484, (1997).

International Search Report for PCT/US01/26125 mailed Mar. 26, 2002.

"IBM DB2 Anonymous Resolution Version 3.8 Technical Information," Publication of IBM Corporation, USA, May 2005 (2 pages).

Friedrich, Andrew, "IBM DB2 Anonymous Resolution: Knowledge Discovery Without Knowledge Disclosure," Whitepaper of IBM Corporation, USA, May 2005 (23 pages).

"DB2 Anonymous Resolution for Public Safety, Corrections, & Criminal Intelligence," Publication of IBM Corporation, USA, Feb. 2005 (2 pages).

"DB2 Anonymous Resolution," Publication of IBM Corporation, USA, May 2005 (2 pages).

Lohr, Steve, "I.B.M. Software Aims to Provide Security Without Sacrificing Privacy," The New York Times, May 24, 2005 (2 pages).

"Application of DB2 Anonymous Resolution to the Financial Services Industry," Whitepaper of IBM Corporation, USA, May 2005 (17 pages).

Written Opinion by the International Searching Authority for International Application No. PCT/US/06/18937, dated Aug. 23, 2007 (10 pages).

* cited by examiner

SYSTEM AND METHOD FOR ELECTRONICALLY PROCESSING ADDRESS INFORMATION

CROSS REFERENCE TO RELATED APPLICATION

This application claims the right to priority based on U.S. Provisional Application No. 60/637,738, filed Dec. 22, 2004, the content of which is incorporated herein by reference.

TECHNICAL FIELD

The present invention relates generally to a system and method for electronically correcting uncoded addresses, and more particularly to a system and method for electronically correcting uncoded addresses using a web-based system.

BACKGROUND

Currently, delivery services such as the United States Postal Service® ("USPS"®) deliver items to recipients based upon an address. The address may contain identifying information such as a name, a street, a city, a state, and a postal code, such as a five-digit ZIP Code®, representing a geographic area. The postal code may represent a smaller geographic area (or segment), such as the area represented by a nine-digit ZIP+4® code. For example, a nine-digit ZIP+4 code may identify geographic segment having a plurality of delivery points, such as residential block, a firm, or a floor of a high rise building. A delivery point can be defined as the mailing address of a Postal Patron where delivery personnel deliver mail, and may include a residential mailbox located on a curb, a door slot, a box on a house, a centralized group of mail boxes, or the location of a receptionist or mailroom. The additional digits of the ZIP+4 code allow more efficient sorting and delivery of items through the delivery process. In addition, high volume customers using USPS may receive discounts for providing a ZIP+4 Code on a mail item. For these reasons, it is desirable to "code" all addresses with a ZIP+4 code, that is, to provide the ZIP+4 Code as a element of the address.

Normally, those using an address list, such as mailers, can code addresses on the address list by using a reference database product that first standardizes the address and then assigns the correct ZIP+4 code to the address. This reference product is commonly referred to as a "ZIP+4 engine," an example of which is the AMS API. The ZIP+4 engine accepts addresses with street, city, and state information and attempts to match them against addresses in a master address database such as the Address Management System ("AMS") database, or a subset of a master address database, such as the Delivery Point File. The address database contains all possible deliverable addresses within a geographical area and may contain information regarding ranges of addresses for a given block in a given city with a five-digit ZIP Code.

USPS uses ZIP+4 Codes and address information to create delivery point bar codes. Delivery point bar codes are bar codes of eleven digits, where five digits are allocated to the ZIP Code, 4 digits are allocated to the ZIP+4 Code, and the last two digits are allocated to a unique delivery point. Thus, the ZIP Code may specify a specific area of a town, a ZIP+4 Code may represent a particular block on a street, and a delivery point code may represent a specific house on the block. Through the use of automated mail processing equipment, USPS is able to apply a delivery point bar code to mail items carrying a ZIP+4 Code, soon after the items are received from the customer. USPS then uses the bar code to sort the mail in delivery sequence order. As a result, a delivery employee can efficiently prepare the mail for delivery, and the time needed for delivery preparation is reduced.

It is possible, however, that an address presented to the ZIP+4 engine may not be found in the address database. Such an address is designated as "incorrect." An incorrect addresses cannot be associated with a ZIP+4 code, cannot be validated to a delivery point, and cannot be supplied with a delivery point bar code. Therefore, it may be referred to as an "uncoded address." An uncoded address may be identified by and received from various sources, such as a National Change of Address ("NCOA") database or mailer supplied address lists. Such addresses may be combined into an incorrect address list that may then be submitted electronically in a standardized format to the National Customer Support Center ("NCSC").

Currently, USPS operates an uncoded address resolution system ("UARS") that is primarily used to process addresses submitted to USPS on change-of-address requests. A UARS record is created when a "new address" of a change-of-address order filed by a customer cannot be matched to an existing deliverable address in the DPF database. Any mailpiece that cannot be matched with an address in the DPF database is rejected from the automated mail stream. Each rejected mailpiece must then be manually handled and processed by a USPS employee. Inefficiencies resulting from manual handling of the mail can be very costly and time consuming, and can diminish customer satisfaction. Indeed, delays in the delivery of forwarded mail to new addresses is the fifth most common complaint from USPS customers.

UARS records are used to generate updates and corrections to the master address database (AMS). Currently, a majority of these updates and corrections are done manually. Such a manual operation is undesirable because it is a labor-intensive endeavor. Furthermore, all manual updates and corrections currently have to be re-keyed, introducing further possibility of human error. Manual corrections also preclude accurate tracking of corrections. Considering the above problems, UARS has had only limited success.

Manual address correction is also attempted when incorrect addresses are received by USPS from mailer lists. If a mailer transmits an incorrect address to USPS and requests correction of the address, a department in USPS tries to generate the correct address. By correcting the address, the chances of finding a matching ZIP+4 Code increase. The department receiving the correction request may be a District Address Management Systems (AMS) department of the USPS. After receiving a request, the AMS department may print out a hard copy of the request form and send the hardcopy form to delivery units in local post offices throughout the United States. The delivery units may fill out the forms with the correct address information and then mail the forms back to the AMS department.

Another method for updating mailer addresses includes sending incorrect addresses as incorrect address records to delivery unit computers, such as computers in local post offices. Delivery unit personnel may then print out a copy of the incorrect address record, use local direct knowledge of the geographic area to make manual corrections on the copy, specify the ZIP+4 Code, and mail the corrections to the AMS department. Once received, the corrected addresses with ZIP+4 Codes may be manually keyed into the AMS database by Address Management personnel.

Several problems are encountered using existing methods to update and correct uncoded addresses. First, delivery units sometime fail to respond to the mailings of printed copies of correction requests. Thus, addresses are not corrected. Second, there is no simple and efficient way to track the correction requests sent to delivery personnel and, thus, performance measurement is not always effective.

It is therefore desirable to provide a system and method to automatically notify delivery personnel that uncoded addresses need to be corrected, and allow delivery personnel to make electronic corrections of the addresses such that address records are resolved quickly with minimal error. It is further desirable to provide methods and systems to allow records of uncoded addresses to be selected without retyping old or new addresses, thus improving accuracy, ease of use, and the success rate of address correction.

SUMMARY

Consistent with one aspect of the invention, there is provided a method for resolving an uncorrected address. The method comprising receiving incorrect address data representing an address, the incorrect address data being incorrect according to predetermined criteria; storing the incorrect address data, in an uncorrected address database, as an uncorrected address record with a status indicator having a first value; receiving a request for an uncorrected address record from a user over a network, the request comprising at least one filter parameter; and selecting an uncorrected address record from the uncorrected address database according to the at least one filter parameter. The method also comprises transmitting the selected uncorrected address record over the network to the user; receiving from the user, over the network, first corrected address data corresponding to the address; storing the first corrected address data in the selected uncorrected address record; and storing, in the uncorrected address database, the selected uncorrected address record with the first corrected address data and with a status indicator having a second value.

Consistent with another aspect of the invention, there is provided A system for correcting an uncorrected address, The system comprises an uncorrected address database containing uncorrected address records having incorrect address data representing an address, the records having a status indicator and the incorrect address data being incorrect according to predetermined criteria; and a server. The server comprises a component for receiving from a user over a network, a request for an uncorrected address record having a status indicator with a first value, the request comprising at least one filter parameter. The server also comprises a component for selecting an uncorrected address record from the uncorrected address database according to the at least one filter parameter and for transmitting the selected uncorrected address record over the network to the user and a component for receiving, from the user over the network, first corrected address data corresponding to the address, the first corrected address data being correct according to the predetermined criteria. The server further comprises a component for storing the first corrected address data in the selected uncorrected address record; and a component for storing the selected uncorrected address record with the first corrected address data and with a status indicator having a second value, in the uncorrected address database.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate embodiments consistent with the invention and together with the description, serve to explain the principles of the invention.

DESCRIPTION OF THE EMBODIMENTS

Figure 1:
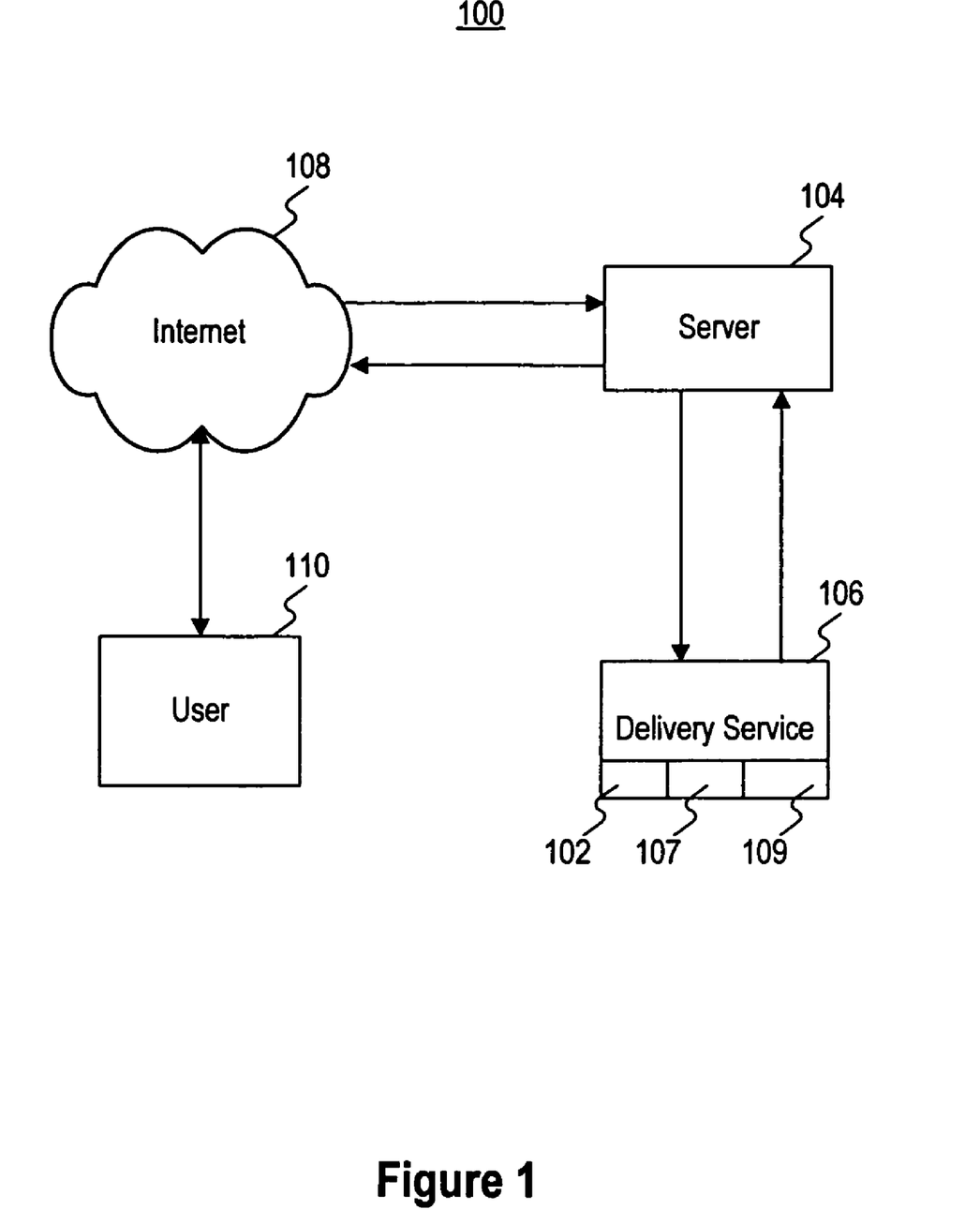
FIG. 1 is an illustration of an electronic address resolution system consistent with the invention.

FIG. 1 is an illustration of an electronic address resolution system 100 consistent with the invention. In one embodiment, electronic address resolution system 100 may allow users 110, such as employees of a delivery service 106, to electronically complete and/or correct addresses stored in an uncoded address database 102, using a web-based system, such as a website executing on a server 104. "Web-based" means that the system is accessible to users 110 over the Internet 108 using the World Wide Web. That is, content is made available, generally in HTML format, using web server software executing on a server computer coupled to the Internet. Completed and corrected addresses may be stored in a master address database, such as AMS database 107, and later uploaded to another database, such as DPF database 109, which may be a subset of the master database.

DPF 109 may be a list of all the current delivery points serviceable by a delivery service such as USPS, together with address information associated with each delivery point. A delivery point may be defined as the mailing address of a service customer to which delivery personnel deposit mail. For example, a delivery point may be a residential mailbox on a curb, a door slot, a mailbox on a house, a mailbox in centralized group of mailboxes at an apartment complex, or the location of a receptionist. For street addresses such as single family dwellings, the delivery point may be represented by the last two digits of the street address, such as the last two digits of a house number. In a high-rise building, where each business or residence in the building may share the same last two digits of the street address, an algorithm may be applied to a secondary address element, such as an apartment or suite number, to create a separate delivery point for each business or residence in the high-rise building.

System 100 may execute on a processor, such as a SUN system B100 server, that operates on a UNIX-based operating system. Multiple users 110 may each use an HTML client program (commonly known as a "web browser") on a processing device, such as a personal computer, to gain access to the content and functionality provided.

Programs operating on server 104 may be written in a programming language such as Java Script with the aid of programming tools such as ColdFusion. ColdFusion is commonly known in the art as a server side application for creating dynamic web pages using data from a variety of sources. It offers an open architecture and built-in search and charting capabilities. Databases 102, 107, and 109 may be Oracle database products, and may be either co-located with server 104 or maintained in separate locations.

Figure 2:
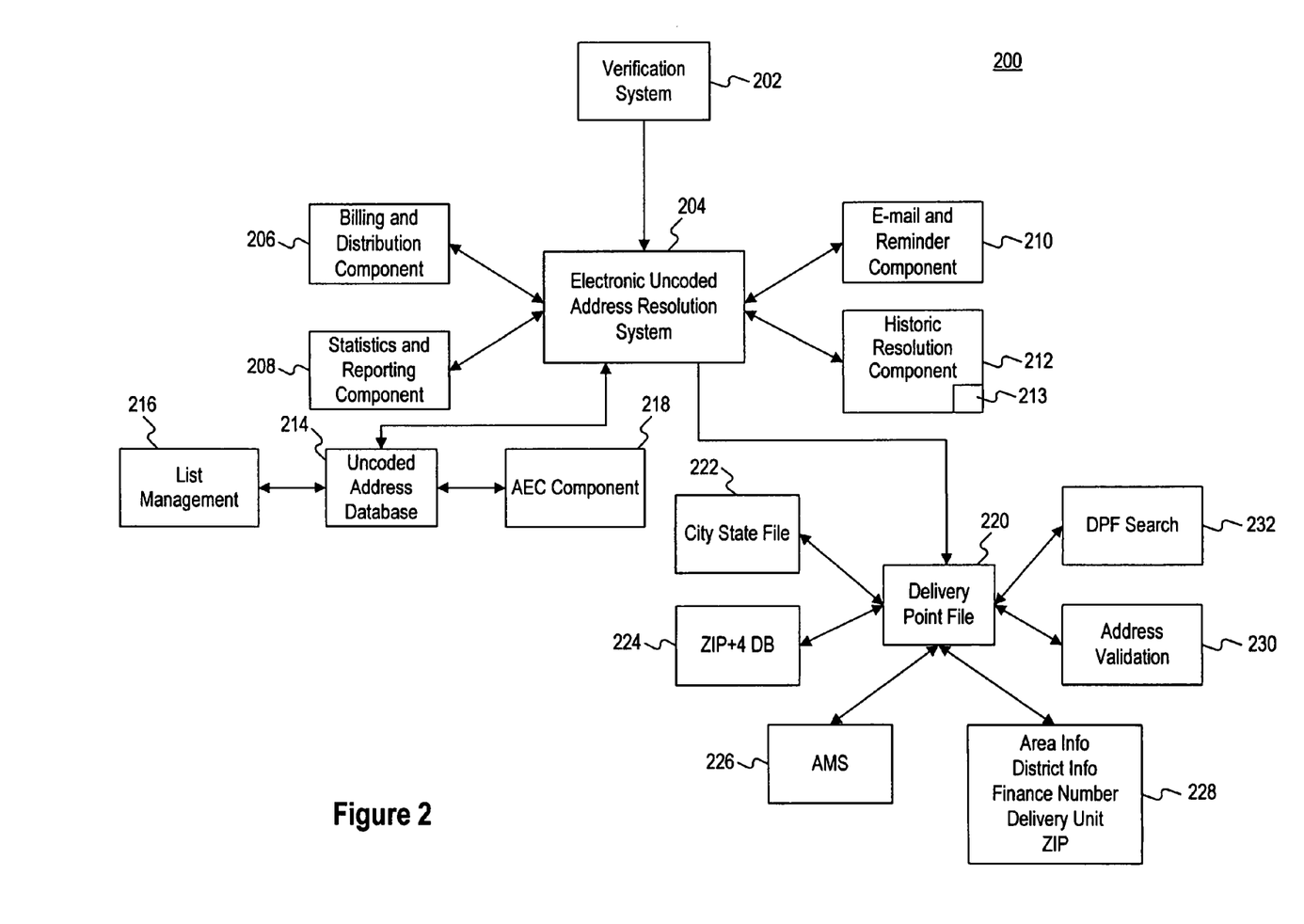
FIG. 2 is an information flow diagram for an electronic address resolution system consistent with the invention.

FIG. 2 is an illustration of an information flow diagram of an electronic address resolution system 200 consistent with the invention. System 200 may include a verification component 202 such as eAccess, an uncoded address resolution component ("eUARS") 204, uncoded address database 102, and a delivery point file 220 comprising a database containing delivery point data, details of which will be provided below.

Uncoded address database 102 may be composed of uncoded address records representing correction requests received from an AEC component 218 and/or a list management component 216. As described in greater detail below, each record includes a status indicator, the value of which describes the status of the record eUARS 204 may use a billing and distribution component 206, a statistics and reporting component 208, an email and reminder component 210, and a historic resolution component 212.

DPF 220 may consist of numerous searchable data elements, including elements contained in city and state file information 222, ZIP+4 database information 224, AMS database 107, and various other types of information, such as area and district information, finance numbers, ZIP Codes, and delivery unit information 228. Finance numbers may consist of various budget information and may be used to group delivery units and ZIP Codes together. DPF 220 may be accessed by a validation component 230 and a DPF search component 232.

eUARS 204 processes records of uncoded address database 102. When a record has been successfully processed, the status indicator of the record is set to "resolved."

Verification component 202 may determine whether a user, such as a delivery service employee, is authorized to log on and use system 204 to resolve uncoded address requests. Specifically, verification component 202 may provide a graphical user interface ("GUI") that accepts a user-entered ID and password. Verification component 202 may then process the user's logon request and verify the user's ID and password. In addition, verification component 202 may be used to control and limit user access by limiting the ZIP Codes for which a user can access data. Limiting user access to data of certain ZIP Codes may be accomplished by requiring the user to register prior to accessing system 200. When a registration request is approved, verification component 202 may assign the user an "Access Level," which designates the limits of access for the user. In one embodiment, some Access Levels may authorize a user to access more than one ZIP Code. After verification of a user's password and user ID is completed, verification component 202 may grant the user access to use eUARS 204 and enable the user to correct uncoded addresses of certain categories.

eUARS 204 may include additional components to aid users. For example, one embodiment consistent with the invention may utilize a billing and distribution component 206. For situations in which tracking numbers are assigned to incorrect address records, billing and distribution component 206 may be used to associate an incorrect or uncoded address with a customer, such as a catalog retailer, who has purchased a change of address correction service. In addition, component 206 may allow delivery service 106 to monitor the status of a particular change of address request represented by a particular incorrect address record.

eUARS 204 may also include a statistics and reporting component 208. Statistics and reporting component 208 may process the tracking numbers assigned to uncoded address records. This may allow delivery service 106 to monitor and record realtime address resolution statistics at any phase of address correction. In addition to recording realtime statistics, component 208 may also provide a robust reports selection screen to offer users various report options. For example, statistics and reporting component 208 may allow users to generate reports listing the number of records received, number of records created, number of records resolved and unresolved, age of the records, and the averages and percentages by any number of selectable parameters. In one embodiment, users at certain designated access levels may be able to sort such statistical reports by ZIP Codes.

eUARS 204 may also include an email and reminder component 210. Email and reminder component 210 may be used to automatically notify delivery force personnel and other users that they have records to correct. Such notification may occur by automated email. Email and reminder component 210 may also be used to automatically notify customers, such as mailing list owners, that corrections are available for retrieval electronically, such as, for example, via the USPS Record Information Bulletin Board System (RIBBS).

Email and reminder component 210 may also be used to schedule and transmit reminders to users. For example, a user may need to be reminded to later contact delivery unit personnel and determine the status of a correction. In one embodiment, reminders may be scheduled for individual records or groups of records.

eUARS 204 may also include a historic resolution component 212 to process records having a status indicator value of "unresolved" and determine whether the addresses in the unresolved records have already been corrected. Historic resolution component 212 may use a historic record database 213 containing resolved records of names and addresses represented as Secure Hash Algorithm ("SHA") code words and names and addresses that have already been corrected. SHA code words are created by component 204 when an address does not match a valid secondary address range (such as an apartment number range) in a ZIP+4 database. One code word is initially created from the name and address as presented. Component 204 then parses each text word of the customer's name and creates individual code words for each text word of the name and the address.

In one embodiment consistent with the invention, historic resolution component 212 may automatically compare unresolved records with resolved records in historic record database 213. If a match is found, historic resolution component 212 changes the status indicator of the unresolved record to "auto corrected."

In one embodiment consistent with the invention, uncoded address database 214 may include records representing uncoded addresses received from multiple sources. For example, records may be received from a National Change of Address ("NCOA") database. Such a record is created when a change-of-address request submitted to delivery service 106 by a customer cannot be matched to an existing deliverable address in master database 107. Uncoded address records may also be received from mailer-supplied address lists, such as a list originating from a commercial mailer.

If a mailer transmits an incorrect address to delivery service 106 and requests correction of the address, AEC component 218 tries to automatically correct the inaccuracy, using various correction processes. Any address not properly corrected AEC component 218 may then be added to uncoded address database 214 for resolution by eUARS 204.

Uncoded address database 214 may also be maintained by a list management component 216. List management component 216 may sort records of database 214 by ZIP Code. Component 216 may also identify and group together duplicate records, allowing corrections made to one record to automatically apply to all duplicate records. List management component 216 may also calculate the length of time it will take for various records or groups of records in database 214 to be corrected. Such a calculation may be based on the number of records in a subset (such as records of a particular ZIP Code and the length of time it "historically" takes to correct records. For records derived from mailing lists from customers, the estimated correction time may be emailed to the customer in order to determine whether the time estimate is acceptable to the customer. Thus, list management component 216 may be used to request approval from the customer to continue with correction of the address. List management component 216 may also sort records into the appropriate ZIP Codes such that there are no more than one hundred unresolved records in any ZIP Code.

In one embodiment consistent with the invention, the data of records in uncoded address database 214 may be compared against DPF 220. As noted above, data in DPF 220 may consist of various components of address information. These components may define the location of a single address, or the location of numerous addresses in a single delivery area or multiple delivery areas. Such components may include city and state information contained city and state file 222, ZIP+4 information contained in ZIP+4 database file 224, and other information stored in a file 228, such as area and district information, finance numbers, ZIP Code information, and delivery unit information.

Figure 3:
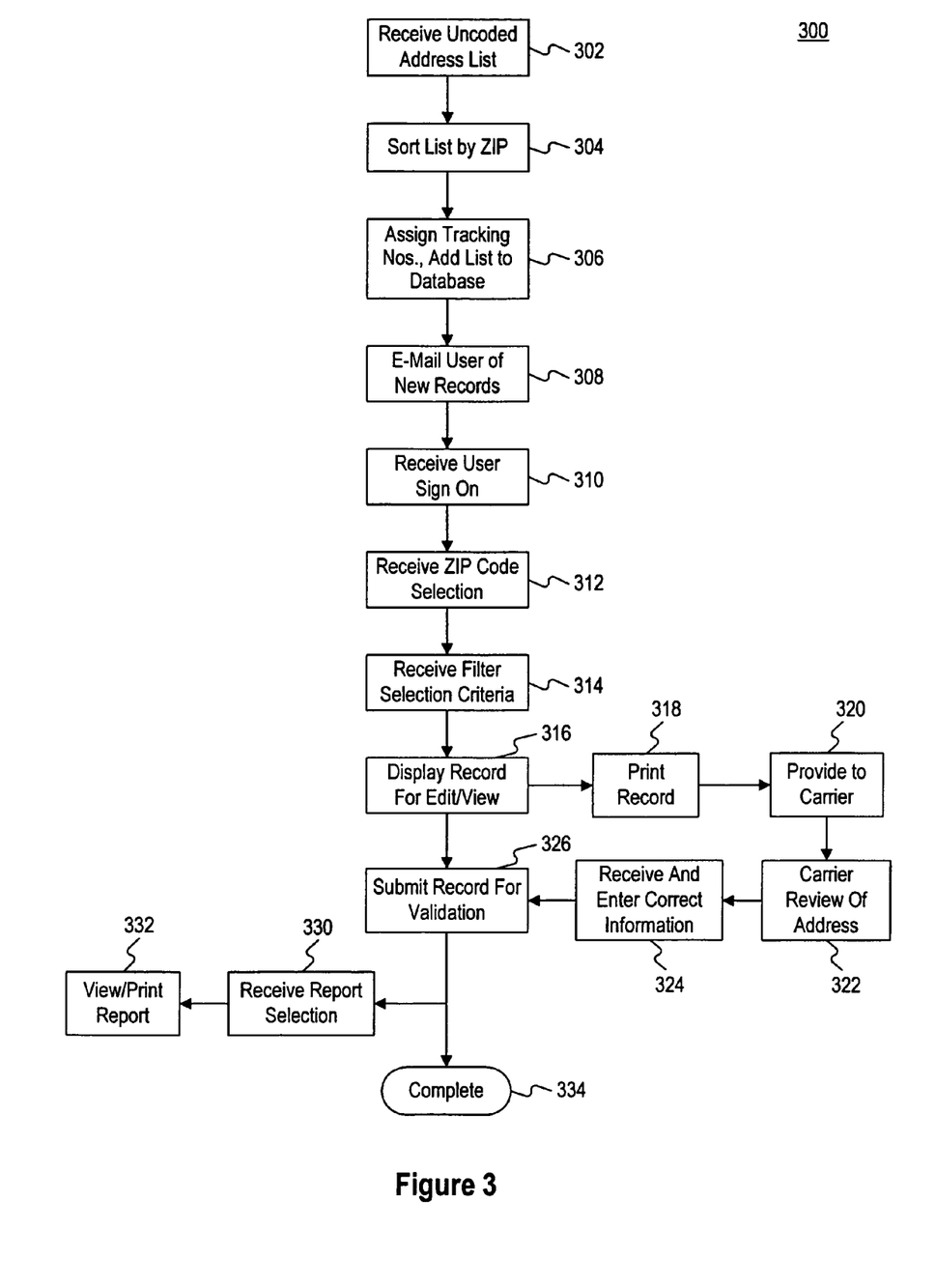
FIG. 3 is a flow chart of a method for electronic address resolution consistent with the invention.

FIG. 3 is a flow chart of a method 300 for processing addresses using an electronic address resolution system. The method may start when the address resolution system receives one or more uncoded addresses (302). The uncoded addresses may be received from multiple sources such as an NCOA database or various mailer-supplied address lists, and may have already been to subjected to various address resolution processes before being received by the address resolution system.

After receiving uncoded addresses, the system may index and sort the list (304). Specifically, the list may be sorted by ZIP Code. Addresses of the list may be formed into uncoded address records, assigned a record tracking number, and added to database of records to be corrected (306).

The system may notify Delivery Force personnel that they have new records to correct (308). This notification may occur by email and may be automated. Such notification may also be provided in the form of a message displayed on a user's display screen when the user logs on to the resolution system.

The system may receive a user sign-on (310), which may be provided by a web-based system with a graphical user interface ("GUI). Such a web-based system may be a website operating on a server. The system may allow users to sign on by recognizing a user ID and password, which may be verified by a verification system such as eAccess. The verification system may control an account setup process for a user by granting the user an "Access Level" and restricting the user to specific ZIP Codes for that Access Level.

Next, the address resolution system may automatically select and display ZIP Codes that are available to a user for viewing and editing based on the user's Access Level (312). The system may then display a screen to the user and automatically flood-fill data field menus, displaying the user's authorized ZIP Codes and information of uncoded address records associated with those ZIP codes. Using the user's Access Level, the system may determine whether a user is authorized to "edit" or "view" a specific record or a group of records. For example, if the user is an Address Management System ("AMS") specialist, the records displayed to the user may be restricted to records in the user's "Area" and "District." Furthermore, the system may display to the user a drop-down box to allow selection of a delivery area managed by the District, with the drop-down choices revealing three-digit ZIP Code areas for which uncoded addresses exist. Once a three-digit ZIP Code is selected, an additional drop-down box may be displayed, revealing all five-digit ZIP Codes within the user's Area for which uncoded address records exist. Multiple ZIP Codes or only a single ZIP Code may be associated with various user Access Levels. A similar automatic flood-fill and ZIP Code selection process may occur for other higher or lower level users. In addition, some users may have both three- and five-digit ZIP Codes automatically selected and flood-filled by the address resolution system.

Next in method 300, the resolution system may offer a user various filter selection parameters (314). These parameters may provide the user with the ability to select the specific records he desires to edit or view, and display for user viewing and/or editing those records selected by the user (316).

Filter parameters may be provided in the form of different menu options displayed to the user in drop-down menus. For example, the system may offer a user the ability to narrow the selection of records for viewing or editing by choosing a specific "record status" from a drop down menu. In one embodiment, each record has a status indicator and the system may offer the user the ability to choose from four different status indicator values: unresolved, resolved, pending, and auto corrected.

An "unresolved record" is a record having an address that requires correction, or one that has already been corrected by a user but which failed "DPF validation." That is, the corrected record was compared against a list of valid delivery points in the DPF and found not to currently match any valid delivery point.

A "resolved record" is a record that has already been corrected and validated, that is, found to match a delivery point through DPF validation or other validation process. The system may allow a user to re-edit resolved records for a specified time period, such as fourteen days from the date of correction. At the end of the period, the resolved record is no longer editable by a user.

A "pending record" is a record is a record that has been corrected by a user and is awaiting DPF validation. These records may have a predetermined time period, such as a 14-day time period, during which they must be validated. That is, the system may repeatedly attempt to match the record with the DPF, which itself is updated from the master address list on periodic basis. Upon the expiration of the 14-day period, the system may change the status of pending record to "unresolved."

An "auto corrected record" is a record that has been corrected automatically by the system. For example, system 200 may automatically submit a record to DPF validation on a periodic basis and, as a result of a new delivery point added to the DPF, may obtain a match. Further, system 200 may automatically modify certain data elements of the record and automatically obtain a successful DPF validation for the modified record. Auto corrected records may also be produced by historic address resolution component 212, as described above. Similar to resolved records, the system may allow a user to re-edit auto corrected records up to 14 days from the date of correction. In some embodiments, the status of the auto corrected record may then be changed to "resolved."

In order to further narrow the number of records displayed for viewing or editing, the system may also offer a user the option of choosing a specific "record type." For example, the system may offer a user the option of choosing from three different record type listings: UARS, AEC, or both. "UARS records" may denote records that were received from the NCOA database and that originated from a change of address request filed by a delivery service customer. "AEC records" may denote records that were received from the Address Element Correction system. These records may or may not have originated from a customer's change of address ("COA") request, but may have originated from a mailer-supplied address list.

Finally, the system may also offer a user the option of choosing a specific "range of days." This option may display records based on the length of time a record has been posted in the electronic address resolution system. The user may choose to display only the oldest records, thus narrowing the number of records available for viewing or editing.

In one embodiment, records may be displayed to a user for either Edit or View action. If the record is displayed in edit mode, the user may modify data in the record. If the record is displayed in view mode, the user may display, but not change, the record. In one embodiment, the system may indicate that "resolved records" may be edited for only fourteen days following the DPF validation date. Thus, a resolved record more than fourteen days past the DPF validation date may not be available for editing and may only be available for viewing.

If the user chooses to edit a record, the system may display an edit screen or window, with various address information of the record automatically flood-filled into corresponding data fields on the screen. For example, data fields displayed on an edit screen may include, among other things, statistical information for records in a given ZIP Code, record identification information pertaining to the record selected, the customer's old address, the customer's new incorrect address, and the customer's corrected address.

The system may display a "record identification" section of an edit screen containing information about a specific record, including but not limited to the status of the record, the run date of an NCOA record, the date an AEC record was loaded into the database, the age of the record, and the tracking number for the record. A "corrected address" section of the edit screen may enable a user to modify address information of the record and submit it for DPF validation or other review process. For both NCOA records and AEC records, the corrected address section may include additional data fields, such as record type, edited address, type of correction, and Navigation/Submit options to permit record searches.

The "record type" in the corrected address section displayed by the system may allow the user to indicate whether a new address can be characterized as a street, high-rise, PO Box, highway, rural route, or general delivery address. By selecting a specific record type such as "highway," the system may provide additional templates for the record and may flood-fill the existing information into the new templates. Thus, the resolution system may show the user what additional fields are needed and what fields are optional for the specific record type chosen.

The system may provide other filter parameters for selection by the user. Of course, a record may also be displayed for viewing and editing without the use of any of the filtering techniques described above.

In one embodiment consistent with the invention, editing (316) in the system may start in response to manual entry by a user of a record's tracking number. In another embodiment, editing (316) may start in response to a scanner being used by a user to scan a barcode off a paper record. When the system responds to a user entering or scanning a record's barcode, the system may display an 'Edit' screen or window, with data for an address automatically flood-filled into certain data fields. As explained above, data fields listed on the edit screen may include, among other things, statistical information for a given ZIP code, record identification pertaining to the record selected, the customer's old address, the customer's new incorrect address, and the customer's corrected address.

The address resolution system may also display various tools and options to assist a user when editing records. For example, in one embodiment a user may be located at a Delivery Force and may have direct knowledge of the geographic area of a record. Accordingly, the system may permit manual entry of data, allowing the user to simply correct the address by typing new data into the applicable data field of the display. The system may also display a "submit" button, allowing a user to submit corrected records for DPF validation by clicking the button.

In another embodiment, the system may allow records to be edited in connection with various database searches for addresses, that is, the user may "browse" databases, searching for addresses which may represent the correct address of the uncoded address record being edited. The system may offer a user the ability to initiate searches by displaying selection buttons. For example, the system may display a Delivery Point File ("DPF") search button. Such a DPF search may be restricted to a specific District of ZIP Codes for which the user is authorized to make corrections. When performing a DPF search, a display window may appear providing several predetermined data fields. Any of the data fields may be used as search criteria to conduct the DPF search. The data fields of the DPF search screen may include fields for, among other things, primary address numbers, street names, address suffixes, ZIP Codes, Plus 4 codes, pre- and post-directions, and section numbers.

In one embodiment, the data fields of the DPF search screen may be automatically flood-filled with information from the record being edited and the system may automatically use this record information to conduct the search. In another embodiment, the system may run an "Ad Hoc DPF search", which allows various data fields in the DPF search screen to first be altered and used as separate search criteria. For example, the system may perform an Ad Hoc DPF search by accepting whole or partial searchable information that is entered by the user. Thus, where a user only knows a portion of a street name, the system may accept a "wild card" search to display all addresses with a street name that contain any variety of the word searched. The system may also conduct searches of multiple ZIP Codes if the user's Access Level gives the user authority to access to multiple ZIP codes.

In one embodiment, the system may respond to a DPF search by generating an address list. The resultant address list may be reviewed by the user. The system may allow the user to select any address on the resultant list by clicking on that specific address. Once clicked, the system flood-fills the data fields of the selected address into the appropriate data fields of the record being edited. This may reduce the amount of manual data input necessary to correct the address of the record being edited.

In another embodiment consistent with the invention, the system may allow user selection of pre-defined search queries that quickly look up and display lists of addresses ("Pick Lists") from which the user may select, or "pick," and apply information from the selected DPF address to change information of the record being edited, with minimal manual intervention. For example, the system may display a "Search Primary" option which, when selected, may quickly search the DPF and display all addresses within a ZIP Code with a specific primary number. Such a search may be helpful when the user suspects that the record being edited contains a correct primary number e.g., a house number.

The system may also display a "Search Street" option which, when selected, may quickly search and display street names within a specific ZIP Code. Such a search option may be helpful when the user suspects that the record being edited contains a correct street name or any portion thereof.

The system may also display a "Search Primary & Street" option, which when selected, may quickly search and display all addresses within a given ZIP Code that may contain both a specific primary number and specific street name. This option may be very helpful to a user seeking to correct addresses with multiple secondary numbers, such as apartment numbers and suite numbers.

The system may also display a "Search Primary-Post" option, which when selected, may quickly search all records within a given ZIP Code that may contain specific primary, pre-directional, street name, suffix and post directional address elements, such as "901" "E", "MAIN", "ST" and "NW".

In one embodiment consistent with the invention, the system may contain a print function. The print function allows the user to print one record per page or print listings of multiple records (318). In addition, the user may print the edit screen of the record being edited and may also print a barcode identifying the tracking number of the record. The printed record may be supplied to delivery personnel such as a letter carrier responsible for the geographic area containing the uncoded address (320). The carrier may more readily identify inaccuracies in the uncoded address record than other personnel. In other words, the carrier may possess the "Delivery Force Knowledge™."

After delivery personnel, such as a letter carrier, reviews an uncoded address on a printed page (322), delivery personnel may then correct the inaccurate or incomplete information and manually write the correction directly on the printed copy of the record. Delivery personnel may then send the printed page, with the correction, back to the user so that the user may edit the record to enter the correction into the record in the address resolution system (324).

In one embodiment, the system may allow the user to manually select the desired record for display and perform the edit operation on the record by manually typing the correction to into the manual entry data fields. In another embodiment, the system may receive a scan of the record tracking number barcode previously printed on the page supplied to the letter carrier. The system displays the corresponding record and flood-fills the appropriate display fields. This may avoid the necessity to manually enter old information or information remaining the same. Thus, unnecessary key strokes may be eliminated when edits are made using Delivery Force Knowledge.

The system may offer users various options in connection with record validation (326). For example, if the record has been displayed to the user for viewing at 316, the system may receive a user command to mark the record as "Correct as shown." The system may then receive a user command to submit the record to DPF validation and change the record's status indicator value to Pending.

If the record has been displayed for editing and the user has entered corrected information, the system may receive a user command to designate the records as "corrected." The system may then receive a user command to submit the record to DPF validation and change the record's status indicator value to Pending.

If a record has been edited and DPF-validation confirms a match for the corrected record, the system may change the status indicator value for the record to Resolved. In one embodiment, a resolved record may be re-edited up to 14 days from the date of successful DPF validation.

If a record has been edited but DPF validation is not successful, this result may be displayed to the user. The system may offer the user additional options to generate a proper correction.

If a record is marked as "Correct as shown," and DPF validation is successful, the system may change the record's status to Resolved. If DPF validation is not successful, the system may display a new message to the user stating that the record does not match any valid delivery point. The system may also display another message asking whether the address has been recently added to the master database, along with buttons to receive a user selection to answer the question. If the user acknowledges that the address may have been recently added to the master database, the system may provide an additional display window stating that the record may be placed in Pending status to await DPF validation. In one embodiment, this Pending status may last fourteen days. After the pending status period has expired, the system may re-label the record as Unresolved.

In one embodiment, resolution of the Resolved uncoded address record may be completed and the record may no longer be edited. This may occur 14 days after the DPF validation date.

At 330, the system may receive user selections of various statistical reports of the records for viewing or printing (332).

In one embodiment consistent with the invention, the resolution system may also incorporate a "reminder function." This function may generate, or "set," reminders associated with individual records or groups of records to ensure that users follow up with other delivery unit personnel on the progress of providing correction information. For example, when the print function is utilized to print out a record and the record is then supplied to delivery personnel, the system may set a reminder for the user to ask the delivery personnel whether any new information has been obtained. The system may send the reminder message to the user when predetermined criteria are met. For example, the reminder may appear on a user's screen after a predetermined time, when the user next logs on to the system. A reminder may also be set upon receipt of a user request for a reminder. In one embodiment, the system may receive user commands to remove a reminder or change the reminder to another date.

Figure 4:
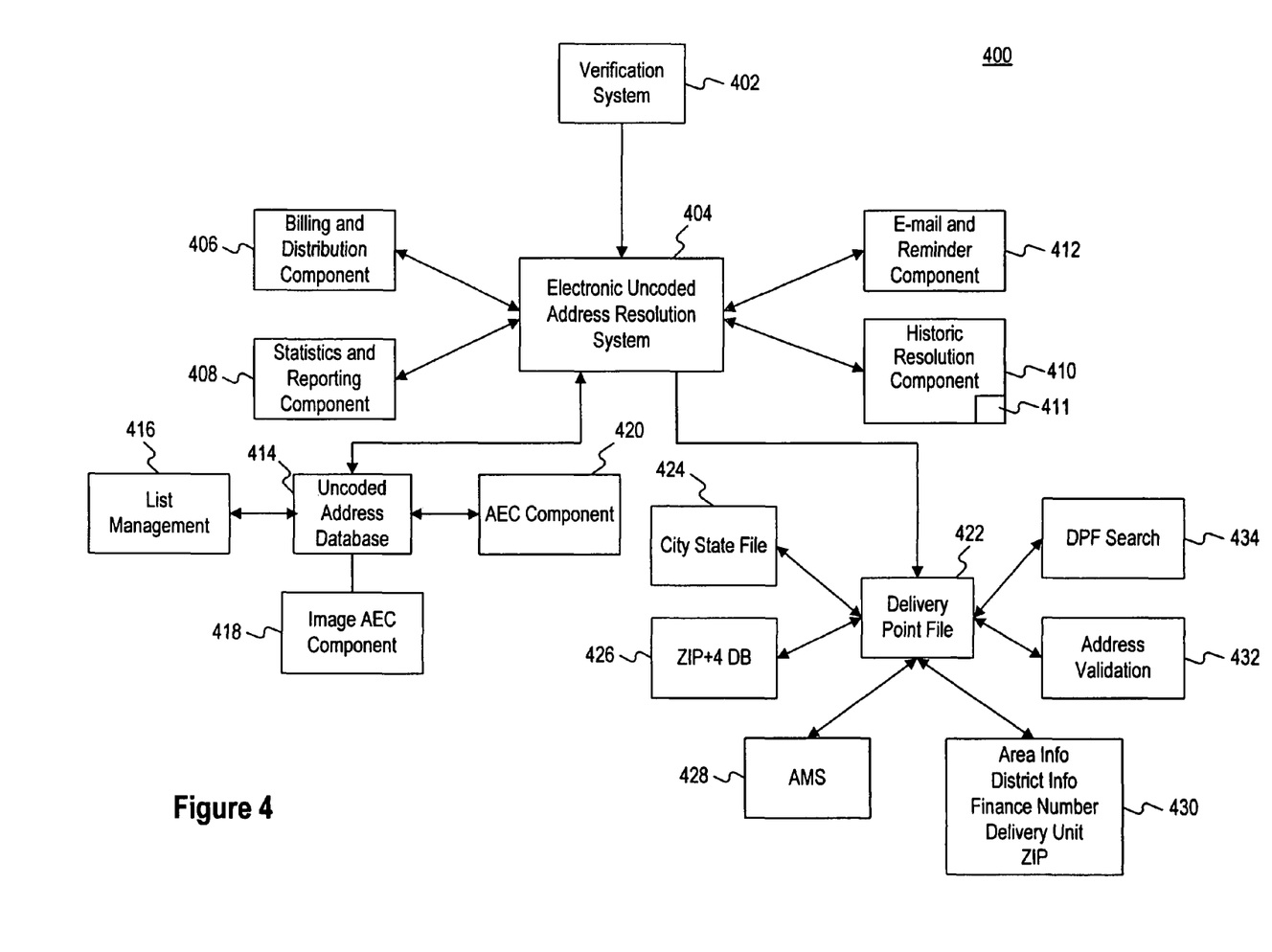
FIG. 4 is an information flow diagram for an electronic address resolution system using imaging, consistent with the invention.

FIG. 4 illustrates a system for an uncoded address resolution using imaging. Similar to system 200 of FIG. 2, system 400 may include a verification component 402, an electronic uncoded address resolution component ("eUARS") 404, an uncoded address database 414, and a delivery point file 422. eUARS system 404 may further include a billing and distribution component 406, a statistics and reporting component 408, an email and reminder component 412, and a historic resolution system 410. These components of system 400 correspond to like named components of system 200 (FIG. 2). Distinct from system 200, however, system 400 may be configured to operate with an Image AEC component 418. With Image AEC 418, delivery service 106 may offer an additional subscription service in which images of uncoded addresses can be captured directly from undeliverable mail items.

Image AEC component 418 may include an Optical Character Recognition (OCR) component. OCR systems are well known in the art as referring to a process of reading text from paper and translating the images into a form that a computer can manipulate. An OCR System may include an optical scanner or camera for reading text and software for analyzing images. For example, a Wide field of View (WFOV) camera may be used to capture images of the front of a mailpiece or parcel. The captured images, processed by OCR, may be received by system 400 as records of uncoded address database 414 as an image or in text format.

Figure 5:
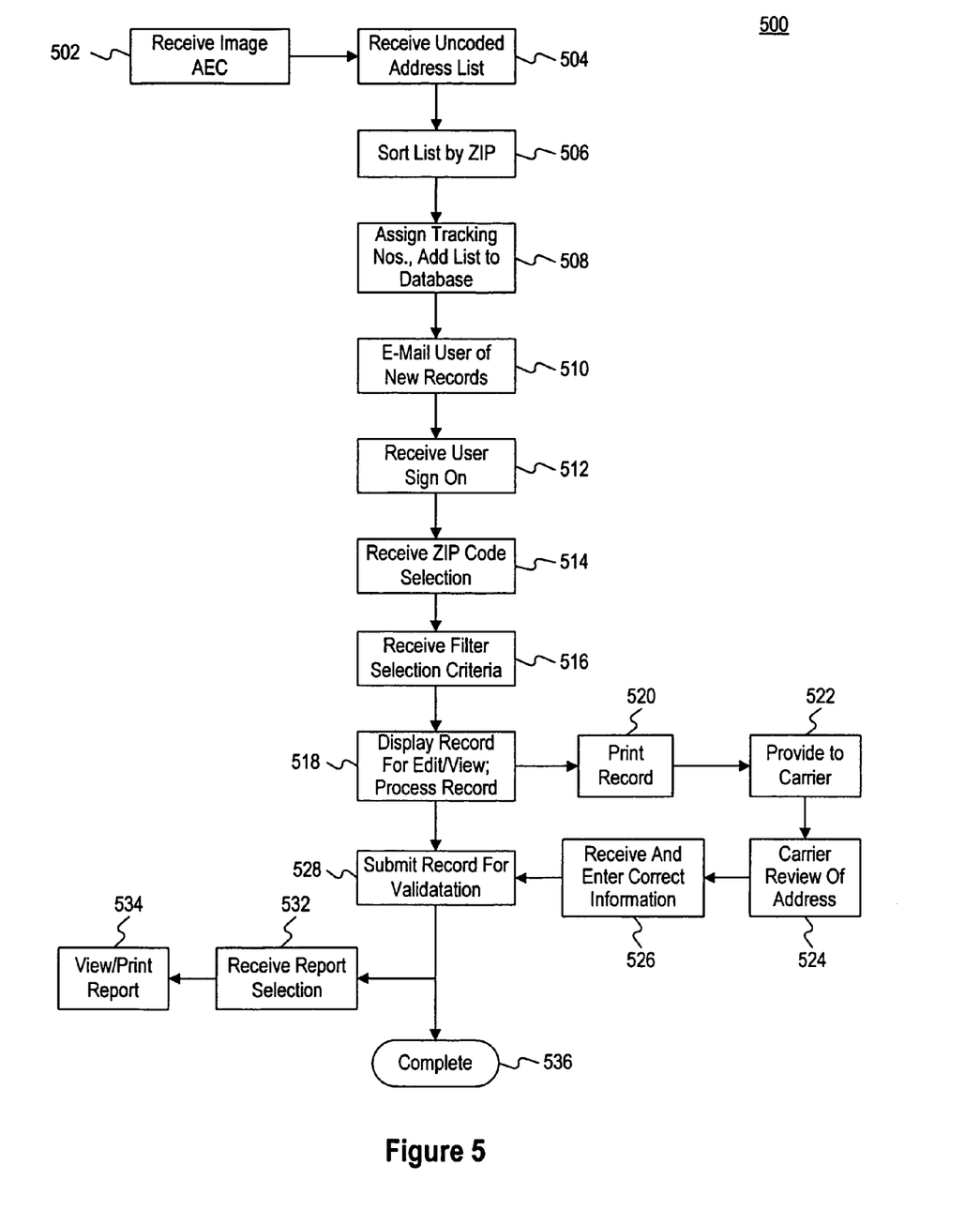
FIG. 5 is a flow chart of a method for electronic address resolution using imaging, consistent with the invention.

FIG. 5 is a flowchart of a method 300 for processing uncoded addresses using an electronic address resolution system with AEC imaging. Similar to method 300, in method 500 uncoded addresses may be received from multiple sources, such as a National Change of Address ("NCOA") database or mailer-supplied address lists. In addition, uncoded addresses may also be received from Image AEC 502. In one embodiment, imaging of an undeliverable piece of mail may occur before that mail item's ZIP+4 Code is submitted for validation. In another embodiment, the imaging of an undeliverable piece of mail may occur after electronic examination of an undeliverable mailpiece. For example, imaging may occur after examining an undeliverable item of mail at Remote Encoding Center (REC). Furthermore, the imaging of a mailpiece may be activated by a code that may be imbedded into a customer's 4-state barcode.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A computer-implemented method for resolving an uncorrected address, comprising the steps performed by a computer of:
    receiving incorrect address data representing an address, the incorrect address data being incorrect according to first predetermined criteria;
    storing the incorrect address data, in an uncorrected address database, as an uncorrected address record with a status indicator having a first value;
    receiving a request for an uncorrected address record from a user over a network, the request comprising at least one filter parameter, the at least one filter parameter comprising a record status;
    selecting an uncorrected address record from the uncorrected address database according to the at least one filter parameter;
    transmitting the selected uncorrected address record over the network to the user;
    receiving from the user, over the network, first corrected address data corresponding to the address;
    storing the first corrected address data in the selected uncorrected address record; and
    storing, in the uncorrected address database, the selected uncorrected address record with the first corrected address data and with a status indicator having a second value.

2. The method as recited in claim 1, comprising:
    generating a reminder message after transmitting and displaying the reminder message to the user when second predetermined criteria are met.

3. The method as recited in claim 1, comprising:
    receiving a user request to generate a reminder, and
    displaying the reminder message to the user when the second predetermined criteria are met.

4. The method as recited in claim 1, wherein receiving incorrect address data comprises receiving incorrect address data from a plurality of sources.

5. The method as recited in claim 1, comprising:
    after storing the selected uncorrected address record, comparing the selected uncorrected address record with a validation database, and
    storing the selected uncorrected address record with a status indicator having one of a first value or a third value, based on the comparison.

6. The method as recited in claim 5, comprising:
    receiving, from the user over a network, a request for an uncorrected address record with a status indicator having the third value;
    transmitting, to the user over a network, an uncorrected address record with a status indicator having the third value;
    receiving, from the user over the network, second corrected address data;
    storing the second corrected address data in the uncorrected address record with the status indicator having the third value to form a re-edited uncorrected address record; and
    storing, in the uncorrected address database, the re-edited uncorrected address record.

7. The method as recited in claim 1, comprising:
    after storing the selected uncorrected address record, comparing the selected uncorrected address record with a validation database, and
    storing the selected uncorrected address record with a status indicator having one of a first value or a fourth value, based on the comparison.

8. The method as recited in claim 7, comprising:
    repeatedly comparing the selected uncorrected address record with a validation database.

9. The method as recited in claim 1, comprising:
    after transmitting the selected uncorrected address record over the network to the user, receiving from the user a request for records from a validation database selected according to search criteria;
    transmitting, to the user over the network, the selected validation records; and
    receiving from the user a designation of one of the selected validation records;
    wherein receiving the first corrected address data comprises copying data from the designated validation record into the selected uncorrected address record.

10. The method as recited in claim 1, comprising:
    after storing the incorrect address data, in the uncorrected address database, as an uncorrected address record with a status indicator having a first value, comparing the stored uncorrected address record with a historic address resolution database containing uncorrected address records with status indicators having the third value, and
    changing the status indicator value of the compared record to one of the first value or the fourth value, based on the comparison.

11. The method as recited in claim 1, wherein the record status is displayed on a menu and the record status is one of statuses of unresolved, resolved, pending, and auto-corrected.

12. The method as recited in claim 1, wherein the second value reflects a status of resolved.

13. The method as recited in claim 1, wherein the request comprises a second filter parameter, the second filter parameter comprising a record type.

14. The method as recited in claim 13, wherein the record type comprises one of a street, a highrise, a post office box, a highway, a rural road, or a general delivery address.

15. A system, comprising:
an uncorrected address database containing uncorrected address records having incorrect address data representing an address, the records having a status indicator, and the incorrect address data being incorrect according to first predetermined criteria; and
a server comprising a processor for executing program instructions to correct an uncorrected address according to a method, the method comprising the steps performed by the processor of:
receiving from a user over a network, a request for an uncorrected address record having a status indicator with a first value, the request comprising at least one filter parameter, the at least one filter parameter comprising a record status;
selecting an uncorrected address record from the uncorrected address database according to the at least one filter parameter and for transmitting the selected uncorrected address record over the network to the user;
receiving, from the user over the network, first corrected address data corresponding to the address, the first corrected address data being correct according to the first predetermined criteria;
storing the first corrected address data in the selected uncorrected address record; and
storing the selected uncorrected address record with the first corrected address data and with a status indicator having a second value, in the uncorrected address database.

16. The system as recited in claim 15, the steps performed by the processor further comprising:
generating a reminder message; and
displaying the reminder message to the user when second predetermined criteria are met.

17. The system as recited in claim 16, wherein generating the reminder message further comprises receiving a user request to generate a reminder message.

18. The system as recited in claim 15, wherein the uncorrected address data base comprises incorrect address data received from a plurality of sources.

19. The system as recited in claim 15, the steps performed by the processor further comprising:
after storing the selected uncorrected address record, comparing the selected uncorrected address record with a validation database;
wherein storing the selected uncorrected address record with the corrected address data comprises storing the selected uncorrected address record with a status indicator having one of a first value or a third value, based on the comparison.

20. The system as recited in claim 15, the steps performed by the processor further comprising:
receiving, from the user over a network, a request for an uncorrected address record with a status indicator having the third value;
transmitting, to the user over a network, an uncorrected address record with a status indicator having the third value;
receiving, from the user over the network, second corrected address data; and
storing the second corrected address data in the uncorrected address record with the status indicator having the third value to form a re-edited uncorrected address record; and
storing, in the uncorrected address database, the re-edited uncorrected address record.

21. The system as recited in claim 15, the steps performed by the processor further comprising:
after storing the selected uncorrected address record, comparing the selected uncorrected address record with a validation database, and storing the selected uncorrected address record with a status indicator having one of a first value or a fourth value, based on the comparison.

22. The system as recited in claim 21, wherein comparing the selected uncorrected address record with a validation database comprises repeatedly comparing the selected uncorrected address record with a validation database.

23. The system as recited in claim 15, the steps performed by the processor further comprising:
after transmitting the selected uncorrected address record over the network to the user, receiving from the user a request for records from a validation database selected according to search criteria;
transmitting, to the user over the network, the selected validation records; and
receiving from the user a designation of one of the selected validation records;
wherein receiving the first corrected address data comprises copying data from the designated validation record into the selected uncorrected address record.

24. The system as recited in claim 15, wherein the record status is displayed on a menu and the record status is one of statuses of unresolved, resolved, pending, and auto-corrected.

25. The system as recited in claim 15, wherein the second value reflects a status of resolved.

26. The system as recited in claim 15, wherein the request comprises a second filter parameter, the second filter parameter comprising comprises a record type.

27. The system as recited in claim 26, wherein the record type comprises one of a street, a highrise, a post office box, a highway, a rural road, or a general delivery address.

* * * * *